No. 709,766. Patented Sept. 23, 1902.
B. F. HATFIELD.
SEED CLEANER AND GRAIN SEPARATOR.
(Application filed Nov. 15, 1901.)
(No Model.) 3 Sheets—Sheet 1.
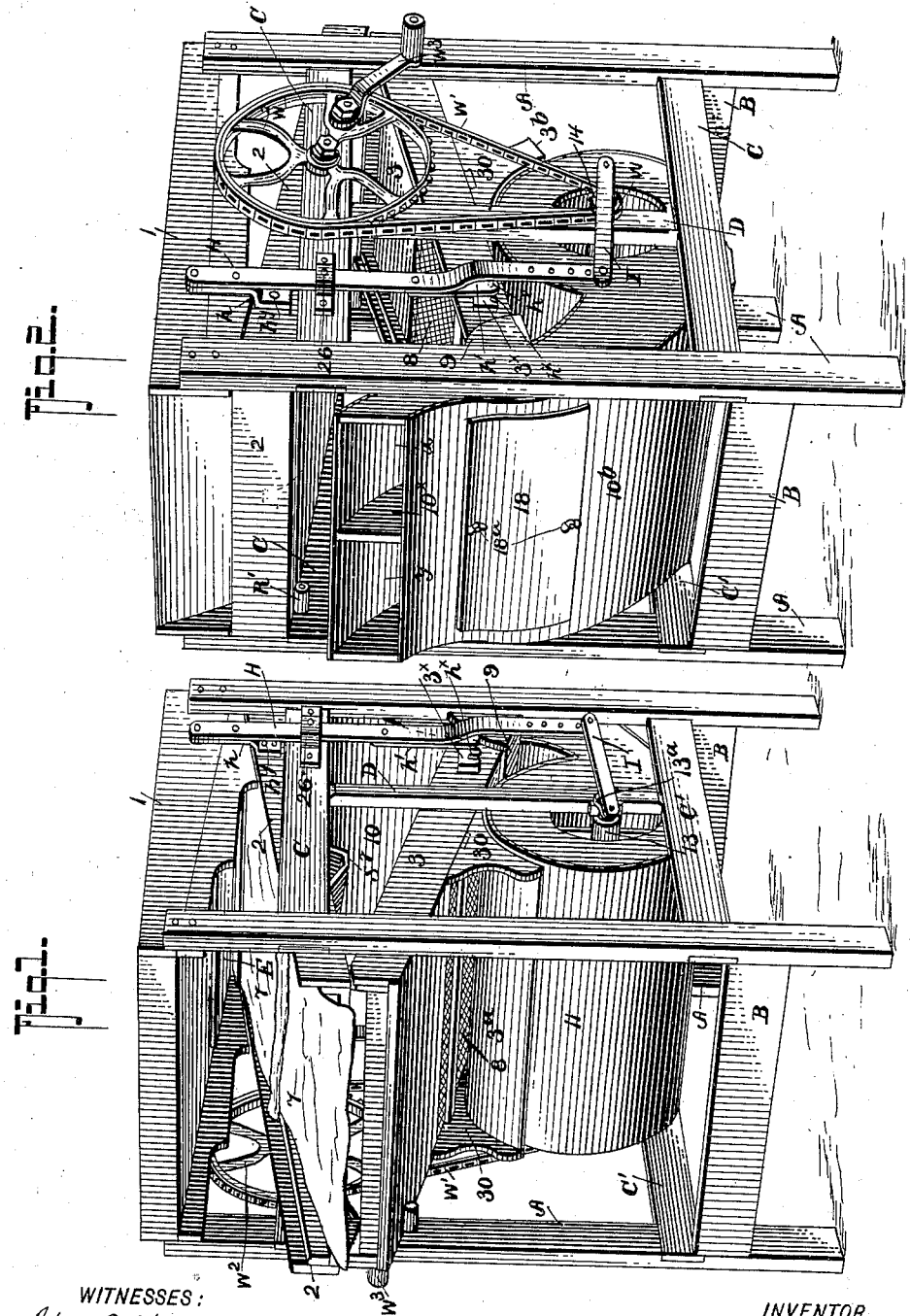
WITNESSES:
Guy V. Worthington
Louis Dieterich
INVENTOR
Benjamin F. Hatfield
BY
Fred J. Dieterich & Co.
ATTORNEYS.

No. 709,766. Patented Sept. 23, 1902.
B. F. HATFIELD.
SEED CLEANER AND GRAIN SEPARATOR.
(Application filed Nov. 15, 1901.)
(No Model.) 3 Sheets—Sheet 2.
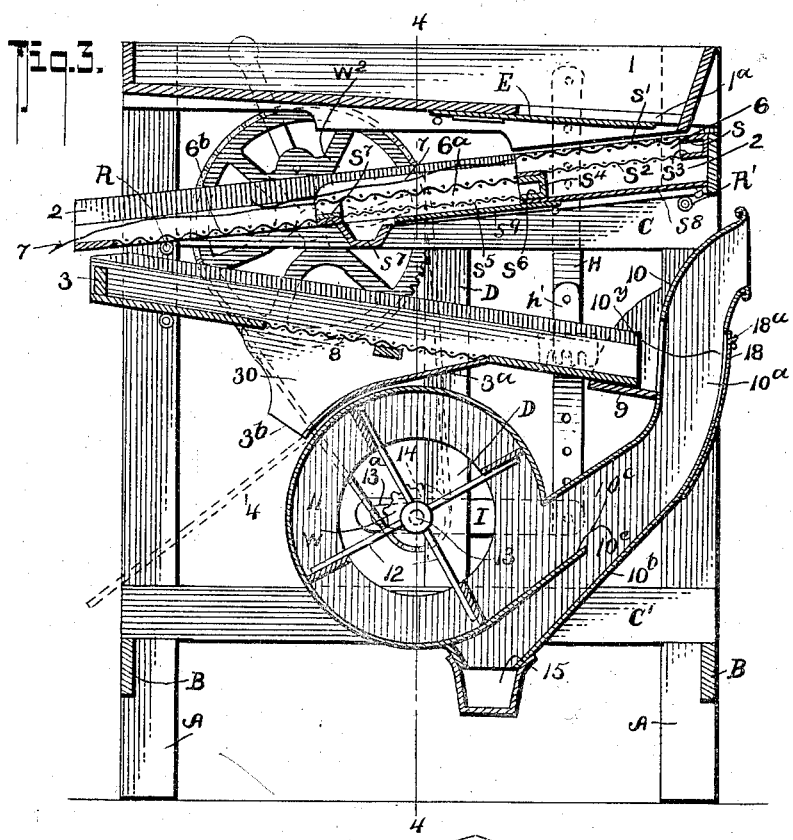
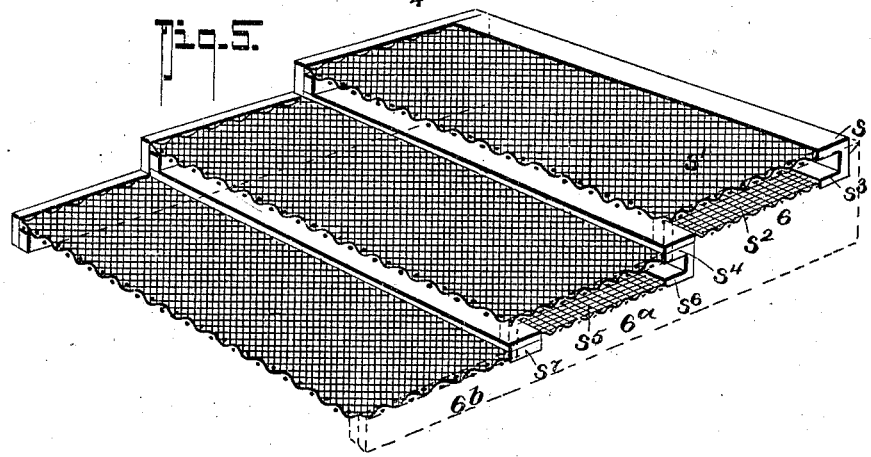
WITNESSES:
INVENTOR
Benjamin F. Hatfield.
BY
Fred G. Dieterich
ATTORNEYS.

No. 709,766. Patented Sept. 23, 1902.
B. F. HATFIELD
SEED CLEANER AND GRAIN SEPARATOR.
(Application filed Nov. 15, 1901.)
(No Model.) 3 Sheets—Sheet 3.
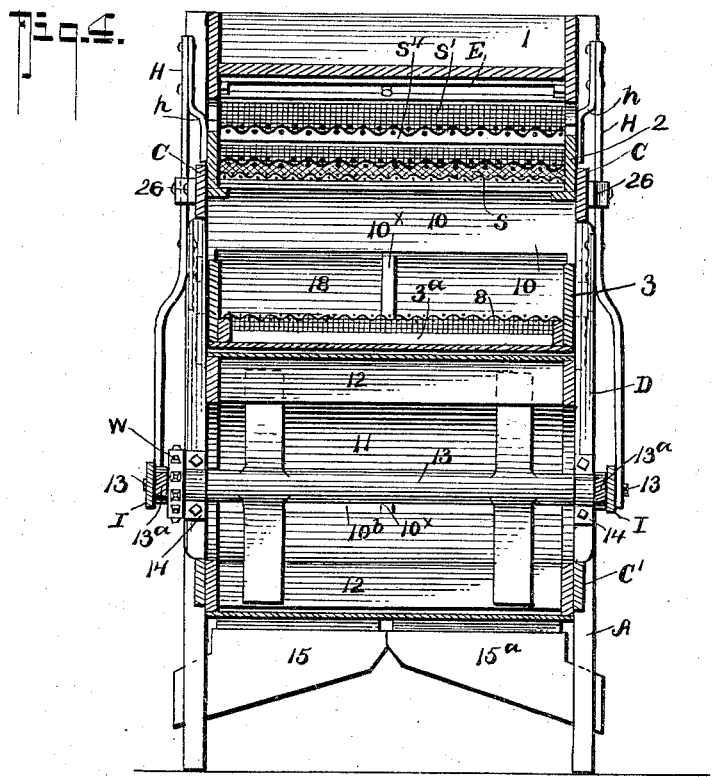
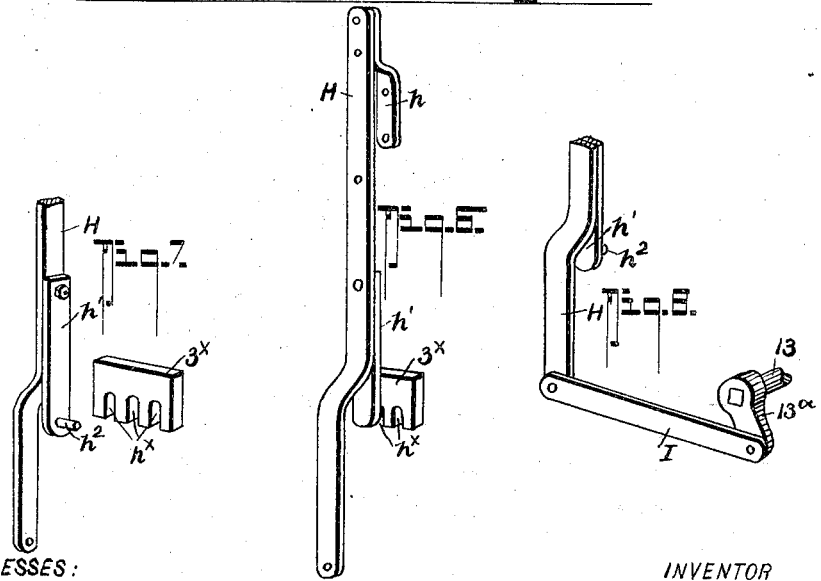
WITNESSES:
INVENTOR
Benjamin F. Hatfield.
BY
Fred G. Dieterich
ATTORNEYS.

UNITED STATES PATENT OFFICE.

BENJAMIN F. HATFIELD, OF DUBLIN, INDIANA.

SEED-CLEANER AND GRAIN-SEPARATOR.

SPECIFICATION forming part of Letters Patent No. 709,766, dated September 23, 1902.

Application filed November 15, 1901. Serial No. 82,352. (No model.)

*To all whom it may concern:*

Be it known that I, BENJAMIN F. HATFIELD, residing at Dublin, in the county of Wayne and State of Indiana, have invented a new and Improved Seed-Cleaner and Grain-Separator, of which the following is a specification.

My invention primarily seeks to provide a seed-cleaning and grain-separating machine of a very simple and economical construction in which the adjustability or the operative arrangement of the several parts can be readily and conveniently accomplished and said parts adapted to effectively operate for their intended purposes; and in its general nature my invention comprehends a novel and peculiar coöperative arrangement of a receiving-hopper, a separating-shoe, a chaff-shoe disposed intermediate the separating-shoe and hopper, a grain-chute into which the separator discharges, and blast devices opering in harmony therewith.

In its more complete nature my invention includes a special and novel construction of combination set of screens forming a part of the separating-shoe adapted for quickly and positively separating the wheat and grain from the cockle and other extraneous material and pass off the cockle, &c., to the outside of the machine without necessity of additional screening or deflector means, such as is usually required in machines of this character, a special construction of receiving-chute being also combined with the separator-shoe for taking up the separated wheat and grain, subjecting them to the air-blast, said chute including means when clover and timothy are passed through the machine for separating the two and causing the separate parts to discharge at different sides of the machine, a simple and novel agitating means controlled from the fan-shaft being also a coöperative element of my complete structure, which in its more subordinate features also includes certain details of construction and peculiar combination of parts, all of which will hereinafter be fully described in detail and then specifically pointed out in the appended claims, reference being had to the accompanying drawings, in which—

Figure 1 is a perspective view of my invention viewed from the front or receiving end. Fig. 2 is a similar view as seen from the opposite end. Fig. 3 is a vertical longitudinal section of my machine. Fig. 4 is a transverse section of the same, taken on the line 4 4 of Fig. 3. Fig. 5 is a detail view of the compound or sectional screen members forming a part of the separating-shoe. Fig. 6 is a detail view of one of the hangers hereinafter described. Fig. 7 is a detail perspective of a part thereof, and Fig. 8 is a detail view illustrating the manner of connecting the hanger with the fan-shaft.

Referring now to the accompanying drawings, in which like numerals and letters indicate like parts in all the figures, A designates the vertical standards or legs, B the end cross bars or braces, and C C' the upper and lower side members joined by the vertical center pieces D D, the whole forming the framing or supporting parts of my machine.

1 designates a hopper mounted on the upper end of the standards A and extending the full length and width of the machine. The hopper has its discharge $1^a$ disposed over the upper end of the chaff-shoe 2, and said discharge-opening is regulated in size or closed off entirely by the slide member E, movable under the opening $1^a$, as clearly shown in Fig. 3. The chaff-shoe 2, which is disposed lengthwise of the machine and between the standards A, is suspended in an inclined position and held for longitudinal reciprocation, its inner end being also adapted to move vertically as it is reciprocated longitudinally in a manner presently explained. The chaff-shoe includes a special construction of screen devices, which, in connection with the separator 3 and the hopper, forms an essential feature of my invention. The chaff-shoe screens, the construction of which is best shown in Figs. 3 and 5, consist of three sections, each of which has metal screen portions, the several sections being indicated by 6 $6^a$ $6^b$. It will be noticed that screen $c$ has a blank or solid surface $s$ at its entrant end, which merges with a perforated portion $s'$, disposed over a second perforated or screen body $s^2$, also provided with a blank surface $s^3$, disposed under the surface $s$ of the upper screen and having its discharge end projected over blank portions $s^4$ of the upper screen member in section $6^a$, which also has a second screen-body $s^5$, having a blank portion $s^6$ and its discharge end projected over the blank end $s^6$ of the single screen-body forming the section $6^b$. The three top screens of the sections 6 $6^a$ $6^b$ run from one end of the chaff-shoe to the other, and the first screen serves to carry sticks, straws, oats, and white hops and other foul material over and dropping the offals onto an oil-cloth curtain 7, which is of equal width with the chaff-shoe and at its upper edge is attached to the portion $s^4$ of said shoe and extends downwardly, covering the screens of sections $6^a$ and $6^b$, and slightly overhangs the lower end of the shoe, so that the chaff, &c., delivered from the first screen-section onto the top of said oil-cloth is directly conveyed away from the machine into the chaff-pile. The second section $6^a$ operates on the grain and seed which passes from the lower screen-body of section 6 to the top section of $6^a$ and on till it has passed through all the five screen-bodies constituting the chaff-shoe screen, such operation serving to remove all the oats and other undesirable material from the wheat. It will be noticed only the first and second screen-sections 6 $6^a$ have bottom screens, such arrangement being provided for allowing the cockle, cheat, and such material as pass through the upper screens of the sections 6 $6^a$ to pass out at the end of the machine over the single screen constituting section $6^b$. By providing the several screens with blank surfaces, as described, a perfect separation of the material is effected without danger of unseparated parts thereof passing or jumping backward between the meeting ends of the several screen-sections. The entire screen is made in three parts, with the largest holes in the uppermost screen-body and correspondingly smaller holes in the screens over which the grain, &c., successively passes, and each section is lapped over the other and bolted together. After the grain and seed have passed through the screens 6 $6^a$ $6^b$ and all chaff and other foul material are removed by passing over the lower end the cockle and such material that pass through the screens onto the bottom of the chaff-shoe 2 are taken out through the spout $s^7$ under said shoe. Said shoe is provided with a bottom portion extending from its upper end down to the said spout $s^7$. The bottom portion just referred to is composed of two sections $s^8$ and $s^9$, slidable to or from each other, the lower end of the upper section overlapping the upper edge of the lower section. (See Fig. 3.) The grain that passes off the screen-section $6^b$ drops onto the separating-screens 8 in the separating-shoe 3, from whence it passes into the grain-box 9, the tailings or separations that drop through screens 8 passing down onto the solid bottom $3^a$ of the shoe and out at $3^b$ onto the deflector-board 4. (See Fig. 3.) The grain-box 9 is fixedly joined with the chute 10 and extends backward and straddles the discharge end of the shoe 3, such connection being provided to permit of a free reciprocal movement of shoe 3 without separating the discharge end thereof from the box 9.

10 designates the grain-chute, which consists of a contracted throat portion $10^a$, that extends up above the lower end of shoe 3, and an enlarged base portion $10^b$, that joins with the fan-chamber 11, in which operates the fan 12 of ordinary construction, the shaft 13 of which is journaled in bearing-boxes 14 on the central-frame uprights, as shown. It will be noticed the grain-chute 10 is so disposed relatively to the discharge end of shoe 3 and the blast devices that the grain discharged into the chute receives the blast from the fan as it passes down to the bottom of the chute and fan-chamber, and in such passage the dust and other light particles still mixed with the grain are blown out of the mouth of the chute as the cleaned grain passes down into the transversely-disposed spouts 15 $15^a$ at the bottom. The grain-chute is made of two parts by means of a central partition $10^x$, which extends the length of the chute, producing, as it were, two distinct chute-passages, one of which, $x$, discharges into the spout 15 and the other, $y$, into the spout $15^a$. The spouts 15 $15^a$ are independently but detachably supported on the lower or discharge end of the chute, whereby to carry off the grain passing down the divided chute at opposite points, their detachability being provided to permit of their ready separation from the chute 10 to allow the grain from both parts of the chute to pass together. The fan-chamber has its blow-off or discharge extended into the chute-passages $x\,y$, and at one side it may extend farther up than the other to produce different blasts in the two passages, it being understood such arrangement of parts provides for the grain passing out on each side of the machine in first and second grades. Furthermore, the construction of parts last explained renders my machine well adapted for separating timothy and clover, as the clover will go in one side of grain-chute and pass out at the same side of the machine as the timothy passes out the other side. At the point where the chute 10 receives the grain from shoe 3 it has an opening normally closed by a slide-plate 18, moved by thumb-screws $18^a$, to provide for access to the discharge end of the shoe 3 when necessary.

The separating-screens in the shoe 3 are in practice of such relative sizes as to separate each kind of grain or seed before same is deposited in the chute 10, and by reason of the correlative arrangement of the shoe 3, its screens, the grain-box, and the chute the different grades of seed and grain are kept from intermixing as they pass down through the chute, and to still further control the blast into the chute 10 the same is provided with air-boards $10^c$ for deflecting the blast to create a stronger blast at one of the air-chutes than at the other. The separator-shoe 3 has pendent sides 30, that extend down and over the fan-chamber or drum to facilitate passing the screenings from the shoe 3 to the front of the machine.

Now comes a novel feature of my invention, which comprehends the means for supporting the chaff-shoe 2 and the separator-shoe 3 and imparting an agitating and reciprocal movement to the same simultaneously and in reverse directions. For such purpose the lower or front end of the chaff-shoe 2 is supported on roller-bearings R R, projected inwardly from the front standards A, and the upper end of the shoe 3 is similarly supported on roller-bearings R' R', also projected inward from standards A and in a vertical plane with rollers R R.

H H designate two strap-iron hangers of like construction, each of which is pivotally hung in a bracket 26 on the side pieces c c of the main frame to vibrate in the longitudinal direction of the machine. At the upper end each hanger H has an angle-bracket $h$ rigidly secured thereto, the free end portion of said bracket $h$ being provided with means for forming a pivotal connection with the upper end of the shoe 2, and at a point below the fulcrum-brackets 26 said hangers have rigidly-secured pendent sections $h'$, each of which has at its lower end a stud $h^2$, adapted to engage a plate $3^x$ on the shoe 3, which plate has on its under edge a series of vertical notches $h^x$, said plates $3^x$ being provided for conveniently connecting with the studs $h^2$, the notches furnishing means for suitable adjustment between the hanger H and the shoe 3 lengthwise. The lower end of each hanger H is pivotally joined to a horizontal arm I, which extends forward on the outside of the machine, and at the front end said arms are pivotally hung upon crank members $13^a$ $13^a$ on the ends of the fan-shaft, one end of which is also provided with a sprocket-wheel W for the sprocket-chain W', that passes up over a sprocket drive-wheel W², having a crank-handle W³ for operating the machine by hand.

From the foregoing description, taken in connection with the accompanying drawings, it is thought the advantages and complete operation of my machine will be readily apparent to those skilled in the art to which it appertains.

It will be apparent that by suspending the shoes 2 and 3, as shown and described, motion being imparted to the fan-shaft through the arms I will cause a swinging movement of the hangers H, and by such movement a reciprocal motion in reverse directions is imparted to the shoes 2 and 3, and at the same time a vertical agitation is also imparted to the free ends—that is, the ends connected to hangers H—by reason of the fulcrum of said hangers H being intermediate the shoes 2 and 3.

While the construction shown in the drawings illustrates a preferred arrangement of my invention, the several details may be varied or modified without departing from my invention or the scope of the appended claims.

Having thus described my invention, what I claim, and desire to secure by Letters Patent, is—

1. In a machine as described, the combination with the hopper, and the separator-shoe, supported on the main frame, and having reciprocal movement thereon; of the chaff-shoe, supported on the main frame for reciprocal movement, and disposed between the separator-shoe and the hopper, said chaff-shoe including a series of separating-screens and a deflector device, a bottom consisting of two members slidable to or from each other, and a trough extended transversely under the shoe, at the lower side of said bottom, and means for imparting reciprocal movement to the two shoes in opposite directions, as set forth.

2. In a machine as described, the combination with the separator-shoe, the blast devices including the grain-chute, said chute having an opening at a point opposite its receiving-mouth, and a closure member for said opening; of a grain-box connected to the receiving-mouth of said chute, said box having portions adapted to extend over or straddle the discharge end of the separator-shoe, said grain-chute having a longitudinal, transverse partition dividing it into two compartments; and air-boards extending from the fan-box up into each of said compartments, the board in one compartment extending farther up than the board in the other, as set forth.

3. In a machine of the character described, the combination with the chaff-shoe, and the separator-shoe, said shoes being inclined in opposite directions, their contiguous ends being slidably supported on rollers on the main frame; of the vibratory hangers H, having at their upper ends and above their fulcrum-point in the bracket 26, the rigidly-attached angle-brackets $h$, pivotally connected to the upper end of the chaff-shoe; and at their lower ends below the fulcrum-point provided with the rigidly-secured bracket portions $h'$ having the pivots $h^2$; the plates $3^x$ provided with the notches $h^x$, secured to the separator-shoe to receive the pins $h^2$, to adjustably connect the separator-shoe to the lower end of said hangers H; the fan-shaft, and intermediate devices driven thereby for imparting a vibratory motion to the hangers H, all being arranged as specified and shown.

4. The combination with the chaff-shoe 2, the apron 7, the separator-shoe 3, and the fan-shaft, having crank portions, said shoes 2 and 3, having roller-bearings at their contiguous ends, the shoe 2, having laterally-projecting studs at its upper end; of the hangers H H, each fulcrumed on the main frame in the bracket 26, at a point between the shoes 2 and 3, their angle-brackets $h$ being pivotally joined to the studs $h^y$, at the upper end of the chaff-shoe, said hangers each having a supplemental dependent member $h'$ carrying a stud $h^2$; a plate $3^x$ carried on the shoe 3, and having vertical notches in its lower face, adapted to receive and seat upon the said lateral studs $h^2$ on the lower end of the arm $h'$; and the arms I, pivotally joined with the lower end of the straps H, and with the cranks on the fan-shaft, all being arranged substantially as shown and for the purpose described.

BENJAMIN F. HATFIELD.

Witnesses:
JOSEPH JOHNSON,
WILLIAM E. FLOYD.